May 29, 1928.

J. A. P. DE GUISE

OIL BURNING DEVICE

Filed June 10, 1927

1,671,352

Inventor
J. A. P. De Guise
by: E. J. Fetherstonhaugh
Attorney

Patented May 29, 1928.

1,671,352

UNITED STATES PATENT OFFICE.

JOSEPH ALEXIS PHILIPPE DE GUISE, OF SOREL, QUEBEC, CANADA.

OIL-BURNING DEVICE.

Application filed June 10, 1927. Serial No. 197,858.

The invention relates to an oil burning device, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the use of a readily destructible material in the construction of heating devices designed for the consumption of oil as fuel; to economize in so far as maintenance charges are concerned and in the fuel consumed; to insure an efficient mixture and therefore promote complete combustion and an odorless fire; to minimize the noise so prevalent in oil burning mechanisms and consequently popularize the use of oil as a fuel in house heating; to conserve the heat generated and direct it for the purposes to which it is to be employed; to utilize natural forces in facilitating the flow of the heated air to the discharge; and generally to provide an oil burning device of a simple and economical construction and of a durable nature.

In the drawings, Figure 1 is a plan view of the burner.

Like numerals of reference indicate corresponding parts in the various figures.

Figure 1:
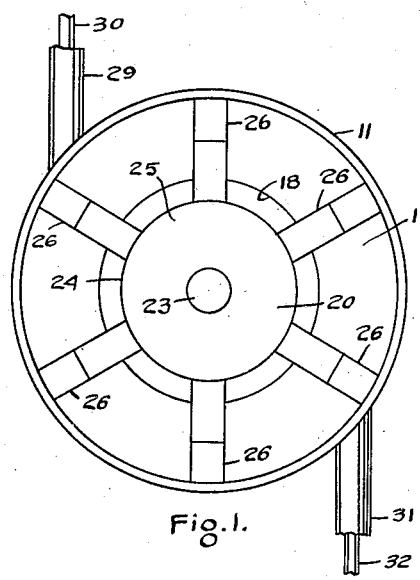
Figure 3:
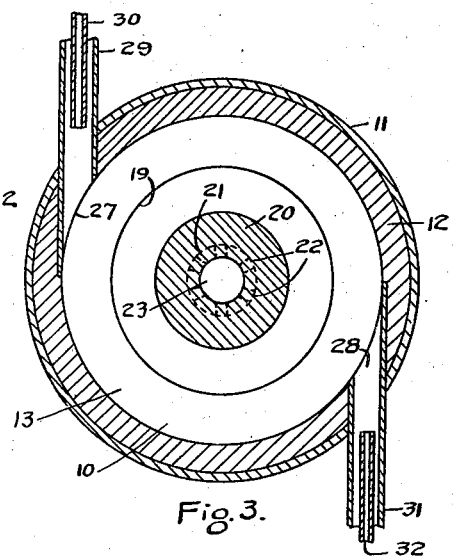
Figure 3 is a horizontal sectional view on the line 3—3 in Figure 2.
Figure 2:
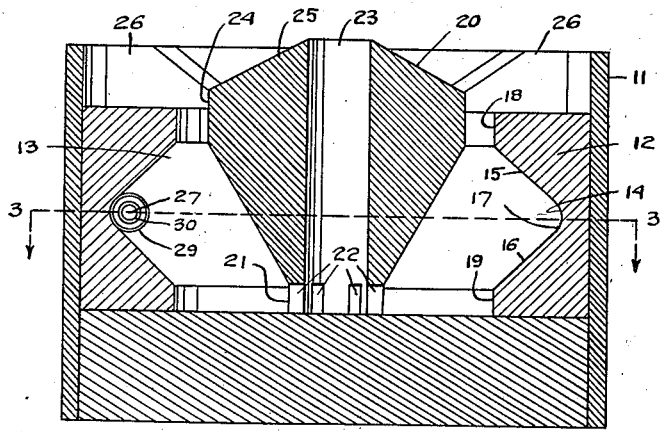
Figure 2 is a vertical sectional view.

Referring to the drawings, the base 10 is formed of refractory material and is circular in shape and contained within the metal casing 11 and resting on this base within the wall of the casing 11, the refractory wall 12 encloses the combustion chamber 13 and this wall 12 is formed with the annular recess 14 with the inclined walls 15 and 16 meeting in the curve 17 and extending from the upper vertical section 18 and lower vertical section 19.

The refractory cone centre piece 20 is formed with a base 21 having a plurality of outlet slots 22 leading into the heat discharge passage 23 in the centre of the cone, which tapers downwardly to the base 21 from the annular vertical surface 24 spaced from the upper vertical section 18 of the wall 12. The upper surface 25 of the cone 20 converges from the vertical surface 24 to the edge of the heat discharge passage 23 and to the surface 25 the braces 26 are attached and extend to the casing 11 to which they are secured.

The fuel inlet 27 enters the combustion chamber 13 in the direction of the centrifugal flow of the heating gases and similarly the fuel inlet 28 diametrically opposite enters the combustion chamber 13 in the direction of the flow.

The air pipe 29 extends into the inlet 27 and the fuel mixture pipe 30 of much smaller diameter extends into the pipe 29 and is connected to suitable feed mechanism and likewise an air pipe 31 extends into the fuel inlet 28 and a fuel mixture pipe 32 into the pipe 31, thus providing a feed in the direction of the flow at two or more places.

In the operation of the oil burning device the fuel is fed in through the fuel mixture pipes and the secondary air is drawn in through the surrounding air pipes and after ignition, not shown herein, the ignited heating gases flow around the combustion chamber and during burning operations the secondary air is drawn in between the wall surfaces 17 and 24, thereby thinning the mixture. The combustible gases flow at great speed centrifugally and are directed by the wall 16 and the tapered portion of the cone to the outlets 22 through which the heated air flows to the discharge passage 23; in fact the whole burner including the passage 23 is a mass of flame and hot air, so that in heating systems the water is kept at a high temperature at a minimum expense in regard to fuel.

What I claim is:—

1. In an oil burning mechanism, a casing, a centre piece of refractory material braced from the casing and tapering to outlet openings leading to a central vertical discharge passage forming a heat director, a base of refractory material for said centre piece and an encircling wall spaced from said centre piece and forming therewith an annular combustion chamber having upper air openings thereinto and feed passages constituting primary mixing chambers.

2. In an oil burning mechanism, a casing, a centre piece tapering at its lower end to outlet openings leading to a central vertical passage forming a heat director, a base for said centre piece and an encircling wall having an annular recess having inclined walls meeting in a curve and forming with said centre piece an annular combustion chamber having upper air openings thereinto and feed passages constituting primary mixing chambers.

Signed at Montreal, Canada, this 1st day of June 1927.

JOSEPH ALEXIS PHILIPPE DE GUISE.